Aug. 20, 1963 H. RICCI 3,101,103
CHAIN SAW SPUR ATTACHMENT
Filed Jan. 29, 1960
FIG. 1
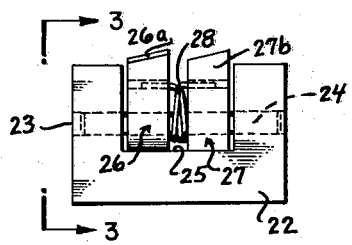
FIG. 2
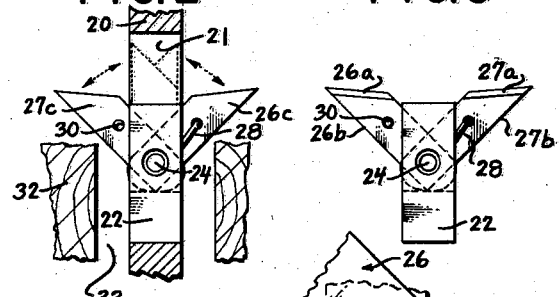
FIG. 3
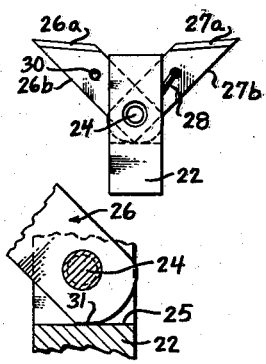
FIG. 4
FIG. 5
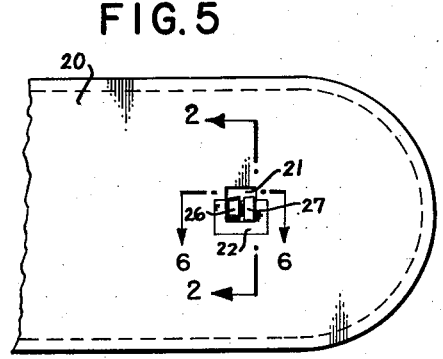
FIG. 6
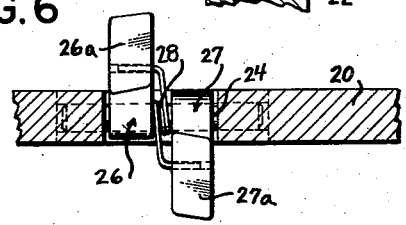
FIG. 9
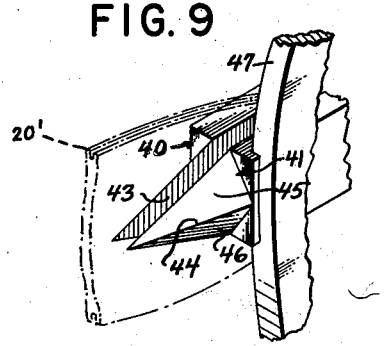
FIG. 7
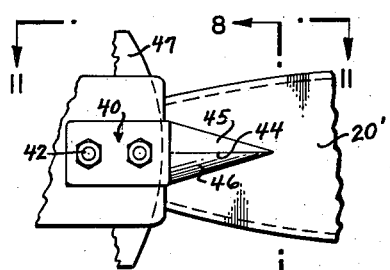
FIG. 8
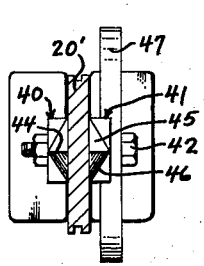
FIG. 11
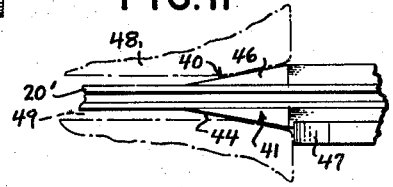
FIG. 10
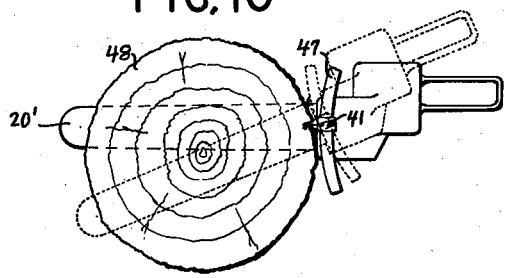
INVENTOR.
HENRY RICCI
BY
Barnes & Seed
ATTORNEYS ace 25. A pair of chisel-like spurs

3,101,103
CHAIN SAW SPUR ATTACHMENT
Henry Ricci, 1908 Charles St., Seattle, Wash.
Filed Jan. 29, 1960, Ser. No. 5,399
3 Claims. (Cl. 143—32)

The present invention relates to an improved spur attachment for power driven chain saws and aims to provide simple and economical means in association with the bar of the chain saw whereby uniplanar cuts can be readily made through a log to thereby conserve trim losses presently prevalent in the logging art. More specifically, the invention aims to provide practical means whereby the kerf from the first bite of a chain saw in a log can be used to accurately guide the bar during subsequent bites.

Other and more particular objects and advantages will, together with these general objects, appear and be understood in the course of the following description and claims, the invention consisting in the novel construction and in the adaptation and combination of parts hereinafter described and claimed.

In the accompanying drawings:

FIG. 1 is a right side elevational view of a first embodiment of a spur mechanism made in accordance with the present invention and preparatory to mounting in the bar of a chain saw as shown in FIG. 5.

FIG. 2 is a fragmentary vertical sectional view taken along the line 2—2 of FIG. 5 and with the chain saw operating in a log.

FIG. 3 is a rear end view of the spur mechanism taken as indicated by line 3—3 of FIG. 1.

FIG. 4 is a detail sectional end view showing the operation of the stop flat at the root end of each spur.

FIG. 5 is a fragmentary right side elevational view of the spur mechanism mounted in the chain saw bar, the cutting chain not being shown.

FIG. 6 is a horizontal sectional view taken along the line 6—6 of FIG. 5.

FIG. 7 is a side elevational view illustrating a modified spur mechanism mounted on a chain saw shown fragmentarily and without the cutting chain.

FIG. 8 is a vertical sectional view taken along the line 8—8 of FIG. 7.

FIG. 9 is a perspective view from the left side of the spur mechanism and with the bar in phantom.

FIG. 10 is a side elevational view showing a chain saw in operation which is equipped with the modified spur mechanism; and FIG. 11 is a fragmentary top view of the modified spur mechanism in operative position in the kerf of a log shown in phantom.

Referring to the embodiment of FIGS. 1–6, numeral 20 identifies the bar of a conventional power driven chain saw which is formed with a cutout 21 into which is fixed a U-shaped dog carrier 22. The arms of the latter have alined through-bores 23 which receive the ends of a wrist pin 24 spaced in parallel relation to a flat inner stop face 25. A pair of chisel-like spurs 26 and 27 are pivoted on the wrist pin and have the coils of a sear spring 28 therebetween. The ends of the sear spring are bent in opposite directions to seat in openings 30 in the spurs whereby the spurs are yieldingly urged toward opposite sides of the carrier 22. Outward swing of the spurs is limited by respective stop flats 31 formed at the root end of the spurs to engage the stop faces 25 as shown in FIG. 4.

The working ends of the spurs 26—27 are formed with respective wedge faces 26a—27a. These faces are not only cut at a like acute angle with the longitudinal axes of the dogs, i.e. with the respective outer faces 26b—27b, but also cut at an acute angle with the respective front faces 26c—27c thereof. Thus the wedge faces 26a—27a not only form wedging edges with the outer faces 26b—27b at the free end of the spurs but also form wedging edges with the front faces 26c—27c. Accordingly, the extreme tip of spur 26, for example, is defined by the intersection of outer face 26b, front face 26c, and wedge face 26a.

It will be noted that the cutout 21 in the bar 20 is shaped to receive the spurs when they are in their retracted position illustrated by dotted lines in FIG. 2 so that when the dogs are retracted in opposition to the spring 18 they are wholly contained within the bar.

In bucking with a chain saw whose bar is equipped with the spurs 26—27 the sawer initially handles the saw in the conventional manner in taking the first bite, and namely pivoting the saw about its root or motor end. Sufficient bite is taken to intorduce the spurs 26—27 into the kerf, this introduction being possible because of the retractability of the spurs in response to pressure against the outer faces 26b—27b. The sawer then backs off slightly with the spurs remaining in the kerf and commences the second bite while manually pressing down on the root or motor end of the saw. When the free front end of the bar 20 attempts to then responsively swing upwardly the spurs 26—27 are forced into the walls of the kerf. This can best be visioned in FIG. 2 wherein the log and kerf are respectively denoted 32—33. The spurs thereupon become a fulcrum for the saw and the existing kerf walls guide the bar 20, laterally speaking, during the start of the second bite. If a further bite is necessary the spurs can be freed by a rearward pull on the saw and a conventional bite taken with the bar remaining in the kerf and the free end of the bar being swung downwardly as the bite progresses. Thus the bar takes a controlled vertical zig-zag path as numerous bites are taken. At times it may be desirable to turn the saw end for end and reposition it in the kerf to conveniently complete the cut. In any regard, by thus progressively using the fulcrum as provided by the spurs, a clean uniplanar cut can be readily made.

The spurs 26—27 need not be mounted near the free front end of the saw bar 20 as illustarted in FIG. 5, but are also operatvie if located at other points along the bar.

In the second embodiment, illustrated in FIGS. 7–11, a pair of wedging spurs 40—41 are mounted by bolts 42 with flat inner faces 33 against the faces of a saw bar $20^1$ at the root end thereof. These wedging spurs each terminate at a point at their front end from which a wedging edge 44 progresses rearwardly in divergence to the inner face 43, this wedging edge being defined by the obtuse intersection of triangular planar wedge faces 45—46. One or both of the spurs may have its base provided with an arcuate bumper 47.

In the operation of the second embodiment of my invention, as illustarted in FIGS. 10–11, the sawer takes a first bite in the log 48 and then wedges the wedging edge 44 of the spurs 40—41 into the mouth of the resulting kerf 49. He then can swing the saw about the log piercing portions of the spur edges 44 as a fulcrum to take additional bites with the walls of the kerf continuing to guide the bar $20^1$ so as to achieve a uniplanar cut. It will be apparent that the spurs 40—41 can be turned end for end and mounted on the outer free end of the bar $20^1$ so that the fulcrum for the saw in the kerf is at the free end rather than the root end of the bar.

The saw may also be equipped with both the spurs 26—27 and 40—41. In such a case the spurs 40—41 are used during bites in which the free end of the bar is to be swung downwardly during the bite, and the spurs 26—27 are used during alternate bites in which the root or motor end of the bar is to be swung downwardly during the bite.

The advantages of the invention, it is thought, will have been clearly understood from the foregoing detailed description of the illustrated preferred embodiments. Minor changes will suggest themselves and may be resorted to without departing from the spirit of the invention, wherefore it is my intention that no limitations be implied and that the hereto annexed claims be given a scope fully commensurate with the broadest interpretation to which the employed language admits.

What I claim is:

1. In combination, a chain saw having an elongated bar about which a cutting chain travels, and spur means mounted in said bar and providing a pair of pivoted spurs spring urged to swing from a retracted position within the confines of the bar to kerf-wall piercing positions extending outwardly from opposite sides of said bar, the swing axis of each of said spurs being longitudinal of said bar.

2. The structure of claim 1 in which said spurs each have a wedge face at their outer end which slopes both with respect to the longitudinal axis of the spurs and the longitudinal axis of said bar.

3. In combination, a chain saw having power means at one end and an elongated bar extending by a free end toward the other end of the saw, a cutting chain driven by said power means and guided about the periphery of said bar, spur means mounted in said bar near its free end and providing a pair of piovted spurs spring urged to swing from a retracted position within the confines of the bar to kerf-wall piercing positions extending outwardly from opposite sides of said bar, said spurs having a common swing axis longitudinal of said bar and each having a wedge face at its outer end which slopes both with respect to the longitudinal axis of the spurs and the longitudinal axis of said bar.

References Cited in the file of this patent

UNITED STATES PATENTS

| | | |
|---|---|---|
| 2,813,556 | Woodworth | Nov. 19, 1957 |
| 2,821,213 | York | Jan. 28, 1958 |